No. 719,086. PATENTED JAN. 27, 1903.
A. J. CHASE.
REFRIGERATING APPARATUS.
APPLICATION FILED NOV. 25, 1901.
NO MODEL.
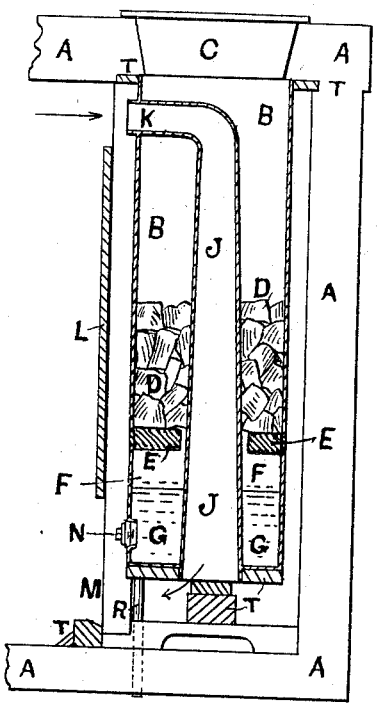
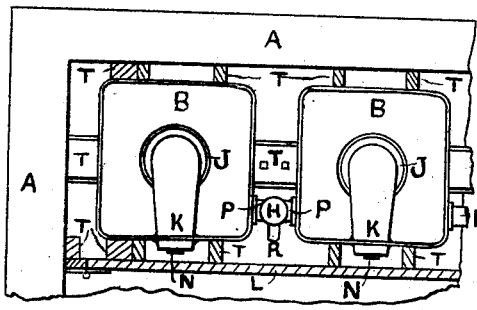
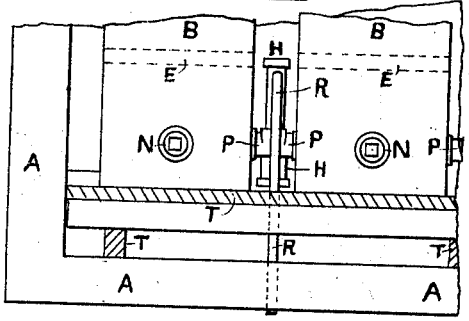
WITNESSES:
Henry P. Richards,
E. G. Emanuel,
INVENTOR:
Andrew J. Chase,
By Sylvenus Walker
Attorney

UNITED STATES PATENT OFFICE.

ANDREW J. CHASE, OF MELROSE, MASSACHUSETTS.

REFRIGERATING APPARATUS.

SPECIFICATION forming part of Letters Patent No. 719,086, dated January 27, 1903.

Application filed November 25, 1901. Serial No. 83,561. (No model.)

*To all whom it may concern:*

Be it known that I, ANDREW J. CHASE, of Melrose, in the county of Middlesex and State of Massachusetts, have invented an Improvement in Refrigerating Apparatus, adapted more especially for railroad freight-cars in transporting perishable food products; and it consists in the construction, combination, and arrangement of a series of refrigerating-tanks, of which the following is a specification.

The objects of my invention are to provide a greater area of exposed refrigerating-surface to the circulating air within the apparatus.

To the drawings hereto annexed, which form a part of this specification, reference is made.

Figure 1 represents a vertical section of a refrigerating-tank constructed according to my invention, showing freezing apparatus. Fig. 2 represents a top plan of a series of such tanks. Fig. 3 is an elevation showing vertical overflow-pipe.

In carrying out my invention in practice in the construction of a refrigerating box-car the walls, floors, and top coverings are constructed double, leaving a suitable intervening space which is filled with shavings or other non-conducting material, as heretofore employed for the purpose, and as such forms no especial feature of my present invention need not be further described.

A represents the double outside walls, floors, and top or roof covering provided with suitable openings through which ice or other freezing substances or mixtures may be introduced into the refrigerating vertical tanks B, the openings being closed by removable covers C when the ice D has been placed therein, resting near the bottom upon the wood-plank floor E, secured to the sides of the vertical tanks B, thus leaving a reservoir F for holding and catching the salt brine or freezing pickle G formed by the melting ice and dissolving salt mixture placed in said tanks B. This lower pickle-reservoir F is provided with a vertical overflow-pipe H, open at top and closed at the bottom to permit automatic drip or discharge of the salt liquid contents through the waste-pipe R when the reservoir is full. Now centrally located within the said vertical tanks B is constructed a conical and vertical or tapering vertical air-shaft J, open at bottom and the upper open end K turned horizontal inward, as shown in Fig. 1. Near the inward vertical faces of the series of freezing or refrigerating tanks B is provided a door or doors L, when in closed position leaving an air-circulating space between the doors and faces of the refrigerating-tanks, as shown in Fig. 2, whereby the warmer air in the compartment enters the upper ends of the vertical air-shafts J and also around the upper end portions of the freezing or refrigerating air and ice tanks B on all four sides of the same, causing a series of cold-air currents to pass downward toward the lower ends thereof and escaping inwardly to and within the compartment containing the food products to be preserved in transportation.

The refrigerating-tanks B are provided near their lower ends with openings, so as to permit the interiors to be cleaned out and the openings closed by doors N or otherwise. The base part of the series may be provided with suitable air-outlet openings M, as shown. The series of reservoirs F are connected together by suitable couplings P, whereby the freezing liquid from the whole series of reservoirs may flow to the vertical overflow-pipe H, and thereby maintain the contents of each reservoir at a uniform height.

The refrigerating-tanks B are rigidly supported in position by a suitable framework of timbers T or in such suitable manner as may be desired.

It will be seen and understood that by the peculiar construction of my freezing apparatus the circulating air within the car or other compartment containing such apparatus cannot come in contact with the water from the melting ice, thereby rendering the air dry and cold as long as the apparatus is in proper working order. Therefore I consider this feature very essential and important in preserving perishable food products.

I am aware of the Letters Patent No. 535,046, dated March 5, 1895. I disclaim the said invention, as it would not serve the purposes sought in my improvement.

I am also well aware that vertical ice-tanks having central air-shafts open at top and bottom are old and in common use.

I am not aware that any refrigerator-car or other refrigerating apparatus has ever heretofore been constructed in such a manner as to prevent the circulating air contained therein from coming in contact with the ice or freezing mixture or with the water from the melting ice.

Having thus described my invention, I claim—

A refrigerating apparatus consisting of a vertical ice-tank provided with an air-shaft open at the upper and lower ends, and a horizontal partition within the ice-tank surrounding the air-shaft, adapted to hold the freezing pickle within the tank separate from and below the ice and connected by pipes to the vertical overflow-pipe, whereby the circulating air is kept from contact with the water from the melting ice; all being constructed, combined and arranged, substantially as described, and for the purposes set forth.

ANDREW J. CHASE.

Witnesses:
SYLVENUS WALKER,
HENRY P. RICHARDS.